Figure 1:
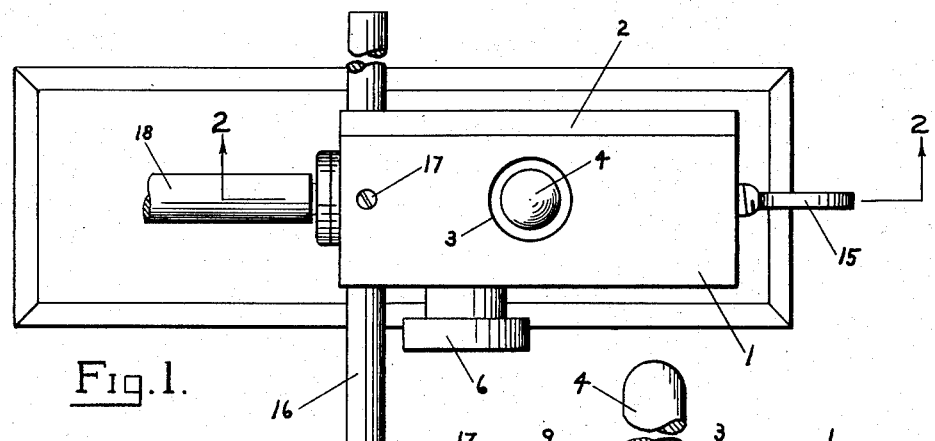

Oct. 26, 1954  R. A. ANDERSON  2,692,748
ADJUSTABLE SUPPORT
Filed Feb. 16, 1950  2 Sheets-Sheet 1

INVENTOR
Ralph Andrew Anderson

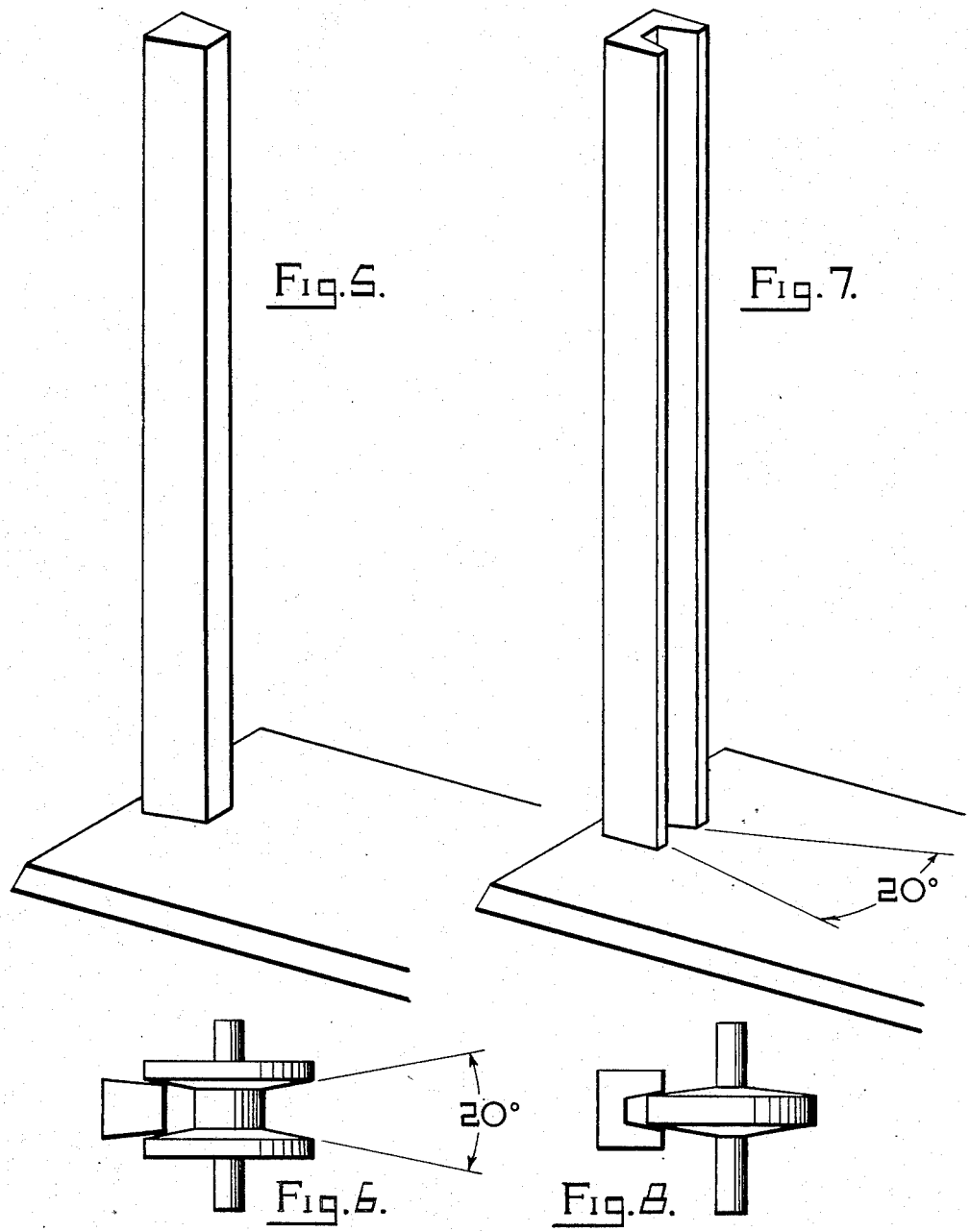

Patented Oct. 26, 1954

2,692,748

UNITED STATES PATENT OFFICE 2,692,748

ADJUSTABLE SUPPORT

Ralph Andrew Anderson, Perth Amboy, N. J.

Application February 16, 1950, Serial No. 144,530

5 Claims. (Cl. 248—125)

The object of my invention is to provide an adjustable support which may be used for holding any suitable apparatus or equipment at any desired level, and in one form in any desired direction, from an upright or support rod on which the adjustable support is mounted.

Another object of my invention is to provide a raising and lowering drive mechanism for the adjustable support to permit very accurate and uniform continuity of adjustable movement of the adjustable support.

Another object of my invention is to provide an adjustable support having a raising and lowering drive mechanism arranged so that increasing the load to be carried by the adjustable support results in a corresponding increase in the effective traction of said raising and lowering drive mechanism on said upright.

A further object of my invention is to provide an adjustable support having a raising and lowering friction drive mechanism arranged to be interchangeably operable on different upright or support rods having the same uniform cross-section.

A particular object of my invention is to provide an adjustable support having a raising and lowering friction drive mechanism in which a positive friction drive is obtained between a special grooved pulley wheel and a critically-sized co-acting upright or support rod of uniform cross-section.

These and many other objects and advantages of my invention will be apparent as a more complete disclosure of an embodiment is made in the following description and attached drawing.

The fundamental operating principle of the invention is the effective gripping action of a specially designed pulley wheel upon a fitted rod. This gripping action occurs when a fitted rod is pressed into and supported between the divergent groove-walls of a pulley wheel having a wedge-shaped peripheral groove where the total angle embraced by the pulley groove walls is about twenty degrees (20°).

In effect, a rod of proper size becomes somewhat wedged between the inner walls of a pulley groove where the inner (total) divergent angle is about twenty degrees (20°), providing the pulley with a firm grip on the rod.

This essential gripping action is maintained under the previous conditions when this specially designed pulley wheel is rotated, and thus provides a positive friction drive action on the rod, therefore enabling the easy and accurate controlled movement along the rod of the entire adjustable support together with any attached equipment. The particular feature of the friction drive mechanism of this adjustable support relates to the specific arrangement of the special drive pulley wheel and the cooperating support rod or column. In other rotary friction drive mechanisms, a primary object has been to provide an arrangement wherein maximum correspondence of the bearing surface of the drive pulley wheel and of the support rod will be obtained. Such construction has thus provided relatively long lines of rolling contact between the pulley groove profile and the support rod profile. Any force urging the pulley (groove) against the support rod would obviously be distributed along the lines of rolling contact, and the contact pressure at any point along these lines is obviously only a fraction of the total applied force. These lines of rolling contact aim to provide a maximum bearing surface between the roller groove and the rod but the distribution and division of the contact pressure along these lines does not result in the maximum possible tractional friction between the roller and rod.

Figure 4:
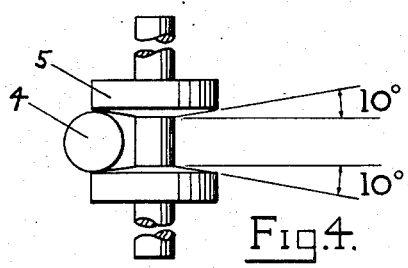

In the rotary friction drive mechanism of the present invention, the primary object has been to provide an adjustable support having an improved friction drive mechanism wherein the contact pressure (resulting from the force urging the pulley wheel against the rod) is concentrated in a small area at the tangential points of contact between the cooperating fitted support rod and the divergent pulley groove walls only. This concentration of pressure at only two points results in a greatly increased tractional friction between the pulley and rod at the rolling points of contact. An equally important object has been to provide an arrangement wherein the wedging or binding of the pulley groove on the fitted support rod in cooperation with the described tangential contact between the fitted support rod and pulley groove walls, results in a maximum contact pressure at the tangential points of contact and provides a maximum tractional friction between the pulley and rod, without requiring a great (external) force urging the drive pulley wheel and rod together. Thus, for example in Fig. 4, as the friction drive pulley wheel 5 is urged against the support rod 4, the inclined pulley groove walls tend to be spread apart as the rod 4 moves into the groove and the friction drive wheel 5 tends to wedge or "bind" at the tangential points of contact between the rod and the pulley groove walls only. It should be understood that the base or bottom of the friction drive pulley wheel groove must not be in rolling contact with the support rod 4 as this would prevent further entry and wedging or binding of rod 4 into the pulley groove. In a preferred construction, the support rod 4 is registered in tangential contact with the divergent pulley groove walls near the maximum peripheral opening of the groove, as shown in Fig. 4.

The arrangement described provides an efficient rotary friction drive mechanism for moving the adjustable support along a support rod wherein the features of concentration of pressure at the tangential points of contact between the divergent pulley grove walls only and the support rod, and application of the mechanical advantage of the inclined plane (the divergent pulley groove walls embracing a small angle), are responsible for the improved wedge-action frictional drive obtained.

In one form of the invention as illustrated in the accompanying drawings, the machine is arranged to raise or lower equipment on an ordinary laboratory stand rod. Modification of the friction drive means for raising or lowering the adjustable support are also illustrated separately from the adjustable support.

Figure 2:
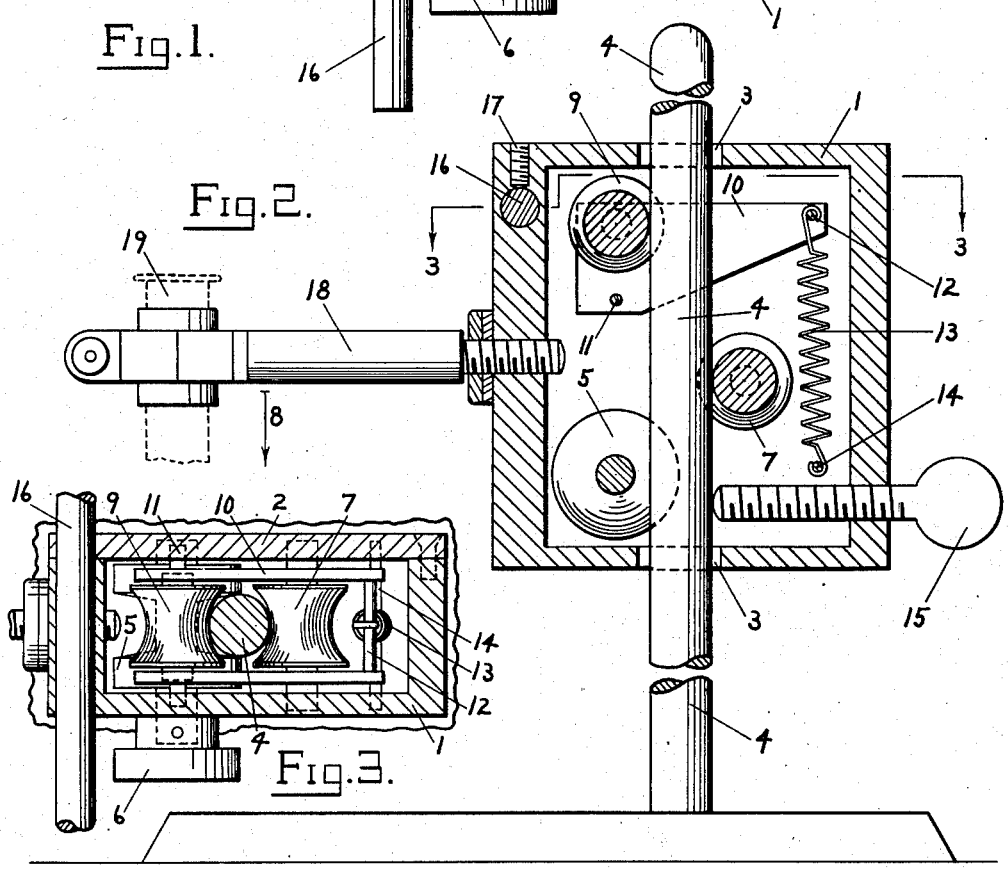
Figure 3:
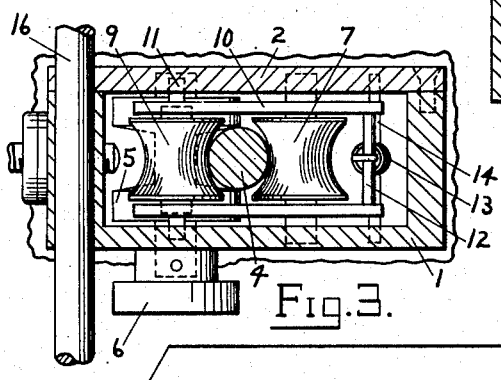

In the drawings, Fig. 1 is a plan view from above the machine mounted on a laboratory stand rod; Fig. 2 is a vertical section of the machine along line 2—2, Fig. 1, showing the position of the rod relative to the integral parts of the machine; Fig. 3, a plan view from above the machine only with a cross-section of the case along line 3—3, Fig. 2, showing the position of the rod relative to the integral parts of the machine but omitting the thumbscrew shown in Figs. 1 and 2; Fig. 4, a detailed view of the special drive pulley wheel and a rod, in actual operating position, showing the essential wedge-like gripping action of the special pulley wheel (groove) upon a rod. Fig. 5 is a plan view of another form of upright or column, having a generally wedge-shaped cross-section, mounted on a base; Fig. 6 is a detailed plan view of the same type special drive pulley wheel shown in Fig. 4, registered in frictional driving connection with a column or upright of wedge-shaped cross-section generally of the form shown in Fig. 5; Fig. 7 is a plan view of another form of upright or column, having a longitudinal wedge-shaped groove of the general form indicated, mounted on a base; Fig. 8 is a detailed plan view of another form of friction drive means for the adjustable support, comprising a drive disc or wheel of the general form indicated, registered in frictional driving engagement with a wedge-shaped groove of an upright or column of the form shown in Fig. 7. It will be understood that the modified drive wheels and/or columns illustrated in Figs. 5–8 may, with obvious and simple changes in the construction shown in Figs. 1–3, be substituted for the drive pulley wheel and column illustrated in Figs. 1–4, in order to provide other equally effective frictional drive means for raising or lowering the adjustable support.

The principle of operation of these modified friction drive mechanisms is identical with that of the form described and shown in more detail in Figs. 1–4, the operation in every case depending upon the increased frictional contact between the drive wheel or disc and its corresponding column or groove resulting from the wedging of the wheel or disc with its respective column or groove.

In one form of the invention illustrated in Figs. 1–4, the case 1, and its attached cover plate 2, constitute a box-like container within which are mounted the operating parts of the machine. Oversize holes 3, 3, are provided in the case 1 to allow a rod 4, to pass through the machine (see Figs. 1 and 2). In a preferred construction, the special drive pulley wheel 5 comprises a drive shaft having a pair of integral spaced apart bevelled discs concentrically secured thereon, the bevelled surfaces diverging at an angle of about twenty degrees, the diameter of the discs being at least about one and one-half times the diameter of the support rod 4, and the bevelled surfaces of the discs each tangentially engaging an opposite side of the support rod as shown in Fig. 4 of the drawings.

One shaft end of the previously described special drive pulley wheel 5, passes through the wall of the case 1, and is there attached to a hand control knob 6, by which means this pulley wheel may be manually rotated to drive the entire assembly along the rod. The other shaft end of special drive pulley wheel 5 is supported by, and rotates in, a hole (or countersink) in cover plate 2. The shaft ends of a simple pulley wheel 7, are supported by and rotate in a hole in the case 1, and one in the cover plate 2.

Thus when any load or force is applied to the machine essentially in the direction shown in Fig. 2 by an arrow 8, this load or force will be distributed between pulleys 5 and 7 (see Fig. 2), and the direction of the force will be that required to maintain the essential frictional gripping action of special drive pulley wheel 5 on the rod 4 (see Fig. 4). If the load or force is applied to the machine in a direction opposite to that shown by arrow 8, the special drive pulley wheel 5 will become disengaged from rod 4, and the drive pulley wheel 5 will then be inoperative. This disengagement is of value when it is desired to rapidly adjust the machine manually approximately to its final position. Because of the diagonal disposition of pulley 7 and drive pulley wheel 5 on opposite sides of the rod 4 (as shown in Fig. 2), resulting in the just described distribution of the applied load (or force), this friction drive mechanism can, by itself, maintain the adjustable support (together with any bracket-attached load) in position on the support rod 4, thus avoiding the necessity for any of the well-known counterweighting or spring-counterbalanced load supporting means. An advantage of this independent, self-supporting action of the invention is in permitting simple interchangeable operation of this adjustable support on different uprights or support rods having the same uniform cross-section. Another simple pulley wheel 9, is cradled as shown between two lever arms 10, 10, the entire pulley-lever system pivoting on a pin 11, supported by the wall of case 1, and the cover plate 2; at the other end of the lever system is a pin 12, attached to both levers 10, 10; from the mid-point of pin 12, a spring 13 is secured, and the other end of the spring 13 is attached to another pin 14, supported by the wall of the case 1, and the cover plate 2 (see Fig. 2). The purpose of this spring and lever system is to force the special drive pulley wheel 5 into close connection with the rod 4 as required for proper operation of the machine (see Fig. 4) especially when little or no load (force) is being applied to the support bracket 18 in the general direction shown by arrow 8 in Fig. 2. Thus sufficient frictional drag and also gripping action (on drive pulley wheel 5) is obtained so that the machine will not by its own weight roll down the rod on which it is mounted, even when the thumbscrew 15 is not screwed in against the rod 4. It may be pointed out that due to the arrangement of the pulley wheels 5 and 7 (Fig. 2), as the load (or force) is applied in the direction of arrow 8, the special drive pulley wheel 5 is forced (wedged) into firmer frictional connection with the rod 4, and that therefore the gripping action and tractional effect of the drive pulley wheel 5 on the rod 4 increases as the applied load increases. Thumbscrew 15 may be used to safely lock the machine in its adjusted position. A rod 16, passing through the front edge of the machine as shown, together with lock-screw 17, as well as support bracket 18 carrying test-tubes 19, etc., are shown as examples of attachments for supporting other equipment from the machine.

The design of the special frictional drive pulley wheel 5, is very critical and is the most essential feature of the invention. A pulley wheel of proper design is shown in Fig. 4 which also shows the essential wedge-like, frictional gripping action of the special drive pulley wheel 5 on the rod 4 as required for operation of the device. Due to the small divergent angle (about 20°) between the pulley groove walls of the special pulley wheel 5, this drive pulley wheel 5 must be fitted to, and will only operate on, rods of the same, or very nearly the same diameter. For instance, the drive pulley wheel in Fig. 4 designed to operate on a one-half inch (½") diameter rod, will not operate at all on a seven-sixteenths inch (7/16") diameter rod. However, by modification of the size of the special drive pulley wheel groove, the device can be made to operate on any specified rod diameter. The required divergent angle of the special drive pulley wheel groove is not strictly limited to twenty degrees (20°) as previously described and shown. However, increasing the amount of this divergent angle will decrease the effective wedge-like, frictional gripping action which is a required feature of this invention. On the other hand, reducing the amount of this divergent pulley groove angle, while increasing the effective frictional gripping action, will make the proper fitting of drive pulley wheel and rod much more critical. Thus the selected divergent angle of twenty degrees (20°) is a practical compromise of these limitations. In the adjustable support arrangement of the present invention, I have found that where the divergent friction drive pulley groove angle is 90 degrees that such pulleys are completely inoperative as a friction drive, and that when the pulley groove angle is 60 degrees such pulleys are operative for lowering the adjustable support but are not very effective for raising it. But I have found that when the pulley groove angle is about 45 degrees or less, that such pulleys provide a very effective friction drive for raising and lowering the adjustable support, together with any attached load, along the support column.

From the foregoing, it may be gathered that I have provided a self-supporting adjustable support for raising and lowering equipment on a support rod by means of an improved rotary friction drive mechanism comprising the combination of a cooperating fitted support rod and a peripherally grooved friction pulley wheel having a small groove angle which enables a wedging or binding of the pulley groove on the fitted support rod at the tangential points of rolling contact between the pulley groove walls only and the fitted support rod.

The operation of this invention is not intended to be limited specifically to rods of essentially circular cross-section, but to broadly include operation on any rod(s) of uniform cross-section upon which the required effective wedge-like, frictional gripping action of the special drive pulley wheel may be obtained.

I am aware that further improvements in the design of the machine such as an adjustment of the position of the pulley wheel 7 towards and away from the rod 4, making possible corrections for wear and misalignment of pulley wheels 5 and 7, can be made, but this involves no departure from the basic principles of the invention.

While I have shown and described the invention in terms of an adjustable support which can be caused to move along a rod by means of a special rotary friction drive mechanism, it should be understood that with the adjustable support (frame) held stationary it could as well have been described in terms of a rotary friction drive means for moving rods.

Although I have illustrated and described a specific form of my invention in which the friction drive action is obtained between a rod of circular cross-section in wedge-like connection with a drive pulley having a wedge-shaped, peripheral groove of about 20° as described, I contemplate that the invention may also be carried out with simple and obvious variations of this wedge-action, friction drive mechanism to accomplish equally effectively the previously outlined objects and purposes.

In the simplest modification, a similar drive pulley wheel having a wedge-shaped, peripheral groove of about 20° as earlier described and shown in Fig. 4, is registered in frictional driving connection with a co-acting upright or column of generally corresponding, wedge-like cross-section, but so that the narrow part (or front edge) of said wedge-shaped column does not contact the base of the peripheral pulley groove.

In another modification, the same wedge-action friction drive is obtained between a column with a longitudinal, wedge-shaped groove having a divergent groove angle of about 20°, and a co-acting wedge-shaped drive wheel or disc having a generally corresponding (convergent) angle, registered in frictional driving connection with said longitudinal groove, but so that the circumferential edge or surface of said drive disc does not contact the base of the longitudinal groove.

It will be obvious that an adjustable support of the type described, wherein either of the just described modified friction drives are used, will not be free to turn on the support rod or column as is the originally described form, but will be guided along a fixed longitudinal path as directed by the related wedge-shaped column or groove.

While I have shown and described a preferred form of my invention and described certain modifications thereof, it will be appreciated that other modifications and changes therein will occur to those skilled in the art without departing from the spirit or principle of my invention, and I do not desire to be limited to the form or details of the embodiments of my invention herein disclosed, or in any manner, other than by the claims appended hereto. It should be particularly emphasized that the specific angles of 20° shown or described for the friction drive pulley wheels (or columns or grooves) is a recommended value for the purpose of illustration only and may be widely varied within the principles of the invention.

I claim:

1. An improved adjustable support comprising in combination, a vertically disposed support column, a pulley frame which is adapted to travel along said support column comprising a box-like casing which encloses a portion of said column therewithin, said casing having upper and lower passage openings therethrough for said column, said casing having a front portion at the front of said column and a pair of sides extending rearwardly therefrom, one each at opposite sides of said column, a first pulley wheel mounted rotatably within said casing between the sides thereof at the front of said column, said first pulley wheel having its axis lying in a first horizontal plane and at a position near the lower part of said casing, a second pulley wheel mounted rotatably within said casing between the sides thereof and engaging the rear surface of said column, said second pulley wheel having its axis lying in a second horizontal plane spaced a small distance above said first-mentioned plane, said pulley wheels having their axes parallel and in a fixed relationship relative to each other and to said casing, said first pulley wheel having a wedge-shaped peripheral groove having the opposed groove wall faces thereof diverging at an angle of from about fifteen to thirty degrees, said divergent groove wall faces being axially spaced apart a suitable distance to provide a maximum peripheral groove opening which is only slightly greater than the diameter of the support column for frictionally engaging the substantially opposite sides only of said support column therebetween and for preventing engagement of the base of said pulley groove with the front surface of said column, drive means connected with said peripherally grooved frictionally engaged pulley wheel for effecting rotation thereof, a movable pulley wheel rotatably mounted within said casing at the uppermost part thereof and engaging the front surface of said column and movable thereagainst and therefrom, resilient means in said casing for urging said movable pulley wheel against said column and reactive in an opposite direction for tilting the upper part of said pulley frame forward for rocking said first and said second fixed pulley wheels into tight engagement with said column, and a bracket arm on said front portion extending longitudinally therefrom in a direction along a line substantially perpendicular to said column, whereby when a load is supported by said bracket arm at a position substantially remote from the front surface of said column, said bracket arm tends to tilt said pulley frame forward for rocking both of said fixed pulley wheels into tight direct load-supporting frictional engagement with said support column.

2. In an adjustable support for raising and lowering equipment on a vertical support column, comprising a pulley frame having a front portion and a pair of sides extending rearwardly therefrom one at each side of said column, a lower and an upper fixed pulley wheel rotatably mounted between the sides of said frame and located at the front and rear, respectively, of said column for carrying the frame therealong, a movable rotatably mounted pulley wheel at the uppermost part of said pulley frame and engaging the front surface of said column, resilient means on said frame for urging said movable pulley wheel against the column, a load-supporting bracket member at the front of said frame, and a handle for rotating one of said fixed pulley wheels, that improvement which comprises making the diameter of said one pulley wheel at least about one and one-half times the diameter of said column, said one pulley wheel having a peripheral wedge-shaped groove wherein the opposed groove wall faces thereof diverge at an angle of from about fifteen to thirty degrees, the divergent groove wall faces being spaced axially apart a suitable distance to provide a maximum peripheral groove opening which is only slightly greater than the diameter of said column whereby the substantially opposite sides only of said column are frictionally engaged between said divergent groove wall faces, the depth of said groove being substantially greater than the radius of said column for preventing contact of the base of said groove with the front surface of said column.

3. An improved adjustable support comprising in combination, a vertically disposed column of uniform circular cross-section, a carriage movable along said column, said carriage having a pair of side portions, one each at opposite sides of said column and an intermediate integral front portion at the front of said column, a single fixed roller rotatably journalled between said side portions and engaging the rear surface of said column, a drive shaft rotatably journalled between said side portions in parallel axial alignment with said roller and spaced apart horizontally from the front surface of said column, said roller and said drive shaft having their axes lying in slightly separated upper and lower horizontal planes, respectively, said drive shaft having a pair of integral spaced apart discs concentrically secured thereon, one at each side of said column, each disc engaging an opposite side of said column, said discs having a radius at least as great as the distance from the center of said column to the axis of said drive shaft, said discs having their intermediate opposed surfaces bevelled and diverging symmetrically from a plane perpendicular to the axis of said drive shaft at an angle of from about seven to fourteen degrees, the opposed bevelled surfaces of said discs thus being frictionally engaged (in a horizontal plane passing through said drive shaft axis) with points on the opposite sides only of said column, the distance between said points of engagement being only slightly less than the diameter of said column, a movable rotatably mounted roller at the upper part of said carriage and engaging the front surface of said column, resilient means on said carriage for urging said movable roller against said column, a load supporting bracket which extends forwardly from said front portion, and a handle on said drive shaft for rotating said discs for moving the adjustable support along said column.

4. An improved adjustable support comprising in combination, a vertically disposed column of uniform circular cross-section, a carriage movable along said column, said carriage having a pair of side portions, one each at opposite sides of said column and a front portion at the front of said column, a single fixed roller rotatably journalled between said side portions and engaging the rear surface of said column, a drive shaft rotatably journalled between said side portions in parallel axial alignment with said roller and spaced apart horizontally from the front surface of said column, said roller and said drive shaft having their axes lying in slightly separated upper and lower horizontal planes, respectively, said drive shaft having a pair of integral spaced apart discs concentrically secured thereon, one at each side of said column, each disc engaging an opposite side of said column, said discs having a radius at least as great as the distance from the center of said column to the axis of said drive shaft, said discs having their column-engaging surfaces bevelled and symmetrically divergent at an angle from about fifteen to thirty degrees, the distance between said divergent surfaces at the maximum radius of said discs being only slightly greater than the diameter of said column, while the distance between said divergent surfaces at the surface of said drive shaft is only slightly less than the diameter of said column, the opposed bevelled surfaces of said discs thus being frictionally engaged (in a horizontal plane passing through said drive shaft axis) with points on the substantially opposite sides only of said column, the distance between said points of engagement being only slightly less than the diameter of said column, a movable rotatably mounted roller at the upper part of said carriage and engaging the front surface of said column, resilient means on said carriage for urging said movable roller against said column, a load-supporting bracket member which extends forwardly from said front portion, and a handle on said drive shaft for rotating said discs for moving the adjustable support along said column.

5. An improved adjustable support comprising in combination, a vertically disposed column of uniform circular cross-section, a carriage movable along said column, said carriage having a pair of side portions, one each at opposite sides of said column and a front portion at the front of said column, a single fixed roller rotatably journalled between said side portions and engaging the rear surface of said column, a drive shaft rotatably journalled between said side portions in parallel axial alignment with said roller and spaced apart from the front surface of said column, said roller and said drive shaft having their axes lying in slightly separated upper and lower horizontal planes, respectively, said drive shaft having a pair of integral spaced apart discs concentrically secured thereon, one at each side of said column, said discs having a radius at least as great as the distance from the center of said column to the axis of said drive shaft, said discs having their intermediate opposed surfaces bevelled and symmetrically divergent at an angle of from about fifteen to thirty degrees, the bevelled faces of said discs each tangentially engaging a substantially opposite side only of said column, the points of engagement lying in a vertical plane parallel to said drive shaft axis which passes down through said column at a position intermediate of said shaft axis and the center of said column but substantially closely adjacent to said center of said column, the distance between said points of engagement in said vertical plane being only slightly less than the diameter of said column, a movable rotatably mounted roller at the upper part of said carriage and engaging the front surface of said column, resilient means on said carriage for urging said movable roller against the front surface of said column, a load supporting bracket member which is secured to and extends forwardly from said front portion, and a handle on said drive shaft for rotating said discs for moving the adjustable support along said column.

References Cited in the file of this patent

UNITED STATES PATENTS

| Number | Name | Date |
| --- | --- | --- |
| 1,371,011 | Waite | Mar. 8, 1921 |
| 1,449,647 | Boykin | Mar. 27, 1923 |

FOREIGN PATENTS

| Number | Country | Date |
| --- | --- | --- |
| 506,266 | Great Britain | May 22, 1939 |